United States Patent
Shiozaki

(10) Patent No.: US 9,625,973 B2
(45) Date of Patent: Apr. 18, 2017

(54) ELECTRONIC APPARATUS WITH DISPLAY UNIT, AND DISPLAY CONTROL METHOD FOR ELECTRONIC APPARATUS WITH DISPLAY UNIT

(71) Applicant: CANON KABUSHIKI KAISHA, Tokyo (JP)

(72) Inventor: Tomoyuki Shiozaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/984,516

(22) Filed: Dec. 30, 2015

(65) Prior Publication Data

US 2016/0195916 A1 Jul. 7, 2016

(30) Foreign Application Priority Data

Jan. 7, 2015 (JP) ................. 2015-001559

(51) Int. Cl.
*H04N 5/222* (2006.01)
*G06F 1/32* (2006.01)
*H04N 5/232* (2006.01)
*G09G 3/20* (2006.01)

(52) U.S. Cl.
CPC .......... *G06F 1/3231* (2013.01); *G06F 1/3265* (2013.01); *G09G 3/20* (2013.01); *H04N 5/23241* (2013.01); *H04N 5/23293* (2013.01); *G09G 2330/022* (2013.01); *G09G 2330/026* (2013.01); *G09G 2330/027* (2013.01); *G09G 2354/00* (2013.01)

(58) Field of Classification Search
None
See application file for complete search history.

(56) References Cited

FOREIGN PATENT DOCUMENTS

| JP | 2001-339627 A | 12/2001 |
| JP | 2008-252526 A | 10/2008 |

*Primary Examiner* — Stephen Coleman
(74) *Attorney, Agent, or Firm* — Cowan, Liebowitz & Latman, P.C.

(57) ABSTRACT

An electronic device capable of shortening display start time when a user approaches while reducing power consumption. A detection unit detects a distance between a display unit and an object. A control unit changes a mode of the display unit according to the detected distance among a display mode, and first and second power saving modes. The second power saving mode is larger than the first power saving mode in power consumption. The second power saving mode is shorter than the first power saving mode in shifting time to the display mode. The control unit sets the display unit to the display mode when the object is closer than a first distance, to the second power saving mode when the object is further than the first distance and closer than a second distance, and to the first power saving mode when the object is further than the second distance.

26 Claims, 8 Drawing Sheets

ELECTRONIC APPARATUS WITH DISPLAY UNIT, AND DISPLAY CONTROL METHOD FOR ELECTRONIC APPARATUS WITH DISPLAY UNIT

BACKGROUND OF THE INVENTION

Field of the Invention

The present invention relates to an electronic apparatus with a display unit and a display control method for an electronic apparatus with a display unit.

Description of the Related Art

There is an electronic apparatus with a display unit that detects user's approach on the basis of information from a human sensor, such as a built-in proximity detection sensor, and controls the display unit. For example, Japanese Laid-Open Patent Publication (Kokai) No. 2008-252526 (JP 2008-252526A) discloses a television receiver that turns ON its power when it is determined that indoor illumination is lit and a person exists by means of a photodetector and a human sensor. Moreover, Japanese Laid-Open Patent Publication (Kokai) No. 2001-339627 (JP 2001-339627A) discloses an image pickup apparatus that is provided with an EVF (Electronic View Finder) as a display unit, and an optical sensor that detects approach of an eye to the finder. The power of the EVF is turned ON when the approach of an eye is detected. The image pickup apparatus reduces power consumption because the power of the EVF is turned OFF when there is no user.

There are various types of display units, such as a liquid crystal display unit and an organic EL display unit, as a display unit equipped with an electronic apparatus. Every display unit needs to apply voltage for driving a display panel, in general. Accordingly, it is preferable that generation of driving voltage for a display unit be stopped whenever it is determined that there is no user even if power of an electronic apparatus is ON in order to reduce power consumption of the display unit.

However, a certain amount of time is needed until the driving voltage is stabilized after completing a voltage step-up operation for generating the drive voltage or a voltage step-down operation. Accordingly, if the generation of the driving voltage for the display unit is stopped when it is determined that there is no user, the display unit cannot display immediately even when a sensor detects a user.

SUMMARY OF THE INVENTION

The present invention provides a technique of shortening display start time (i.e., waiting time until starting to display) at the time of detecting user's approach while achieving reduction of power consumption in an electronic device that controls display according to a user's distance to a display unit.

Accordingly, a first aspect of the present invention provides an electronic apparatus comprising a display unit, a detection unit configured to detect a distance between the display unit and an object, and a control unit configured to change an operation mode of the display unit according to the distance between the display unit and the object detected by the detection unit. The operation mode includes at least a display mode in which the display unit displays an image, and first and second power saving modes in which power consumption is smaller than power consumption in the display mode. The power consumption in the second power saving mode is larger than the power consumption in the first power saving mode. Shifting time to the display mode from the second power saving mode is shorter than shifting time to the display mode from the first power saving mode. The control unit sets the display unit to the display mode when the object is at a position of which distance from the display unit is shorter than a predetermined first distance, sets the display unit to the second power saving mode when the object is at a position of which distance from the display unit is longer than the first distance and is shorter than a predetermined second distance, and sets the display unit to the first power saving mode when the object is at a position of which distance from the display unit is longer than the second distance.

Accordingly, a second aspect of the present invention provides an electronic apparatus comprising a first display unit, a second display unit, a detection unit configured to detect a distance between the first display unit and an object, and a control unit configured to change operation modes of the first display unit and the second display unit according to the distance between the first display unit and the object detected by the detection unit. Each of the operation modes for the first display unit and the second display unit include at least a display mode for displaying, and first and second power saving modes in which power consumption is smaller than power consumption in the display mode. The power consumption in the second power saving mode is larger than the power consumption in the first power saving mode. Shifting time to the display mode from the second power saving mode is shorter than shifting time to the display mode from the first power saving mode. The control unit sets the first display unit to the display mode and sets the second display unit to the first power saving mode when the object is at a position of which distance from the first display unit is shorter than a predetermined first distance, sets the first display unit to the display mode and sets the second display unit to the second power saving mode when the object is at a position of which distance from the first display unit is longer than the first distance and is shorter than a predetermined second distance. The control unit sets the first display unit to the second power saving mode and sets the second display unit to the display mode when the object is at a position of which distance from the first display unit is longer than the second distance and is shorter than a predetermined third distance. And the control unit sets the first display unit to the first power saving mode and sets the second display unit to the display mode when the object is at a position of which distance from the first display unit is longer than the third distance.

Accordingly, a third aspect of the present invention provides a display control method for an electronic apparatus with a display unit, the display control method comprising a setting step of setting up a first distance and a second distance that is longer than the first distance about a distance from the display unit to an object, a detection step of detecting a distance between the display unit and the object, and a control step of changing an operation mode of the display unit based on a distance between the display unit and the object detected in the detection step among a display mode in which an image is displayed, a first power saving mode that is smaller than the display mode in power consumption, and a second power saving mode that is smaller than the display mode and larger than the first power saving mode in the power consumption. Shifting time to the display mode from the second power saving mode is shorter than shifting time to the display mode from the first power saving mode. The display unit is set to the display mode when the object is at a position of which distance from the display unit is shorter than a predetermined first distance, is set to the second power saving mode when the object is at a position of which distance from the display unit is longer than the first distance and is shorter than a predetermined second distance, and is set to the first power saving mode when the object is at a position of which distance from the display unit is longer than the second distance in the control step.

Accordingly, a fourth aspect of the present invention provides a display control method for an electronic apparatus with a first display unit and a second display unit, the display control method comprising a setting step of setting up a first distance, a second distance that is longer than the first distance, and a third distance that is longer than the second distance about a distance from the first display unit to an object, a detection step of detecting a distance between the first display unit and the object, and a control step of changing each of operation modes of the first display unit and the second display unit based on a distance between the first display unit and the object detected in the detection step among a display mode in which an image is displayed, a first power saving mode that is smaller than the display mode in power consumption, and a second power saving mode that is smaller than the display mode and larger than the first power saving mode in the power consumption. Shifting time to the display mode from the second power saving mode is shorter than shifting time to the display mode from the first power saving mode. In the control step, the first display unit is set to the display mode and the second display unit is set to the first power saving mode when the object is at a position of which distance from the first display unit is shorter than the first distance, the first display unit is set to the display mode and the second display unit is set to the second power saving mode when the object is at a position of which distance from the first display unit is longer than the first distance and is shorter than the second distance, the first display unit is set to the second power saving mode and the second display unit is set to the display mode when the object is at a position of which distance from the first display unit is longer than the second distance and is shorter than the third distance, and the first display unit is set to the first power saving mode and the second display unit is set to the display mode when the object is at a position of which distance from the first display unit is longer than the third distance.

According to the present invention, since the power of the display unit is turned OFF when there is a user at the distance that is determined that the user does not use the display unit, power consumption is reduced. On the other hand, since a display action is started when the user approaches within the distance range that is determined that the user uses the display unit, the display start time at the time of detecting user's approach is shortened.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

A display apparatus is taken up in a first embodiment described below and an image pickup apparatus is taken up in a second embodiment as electronic apparatuses according to the present invention.

Figure 1:
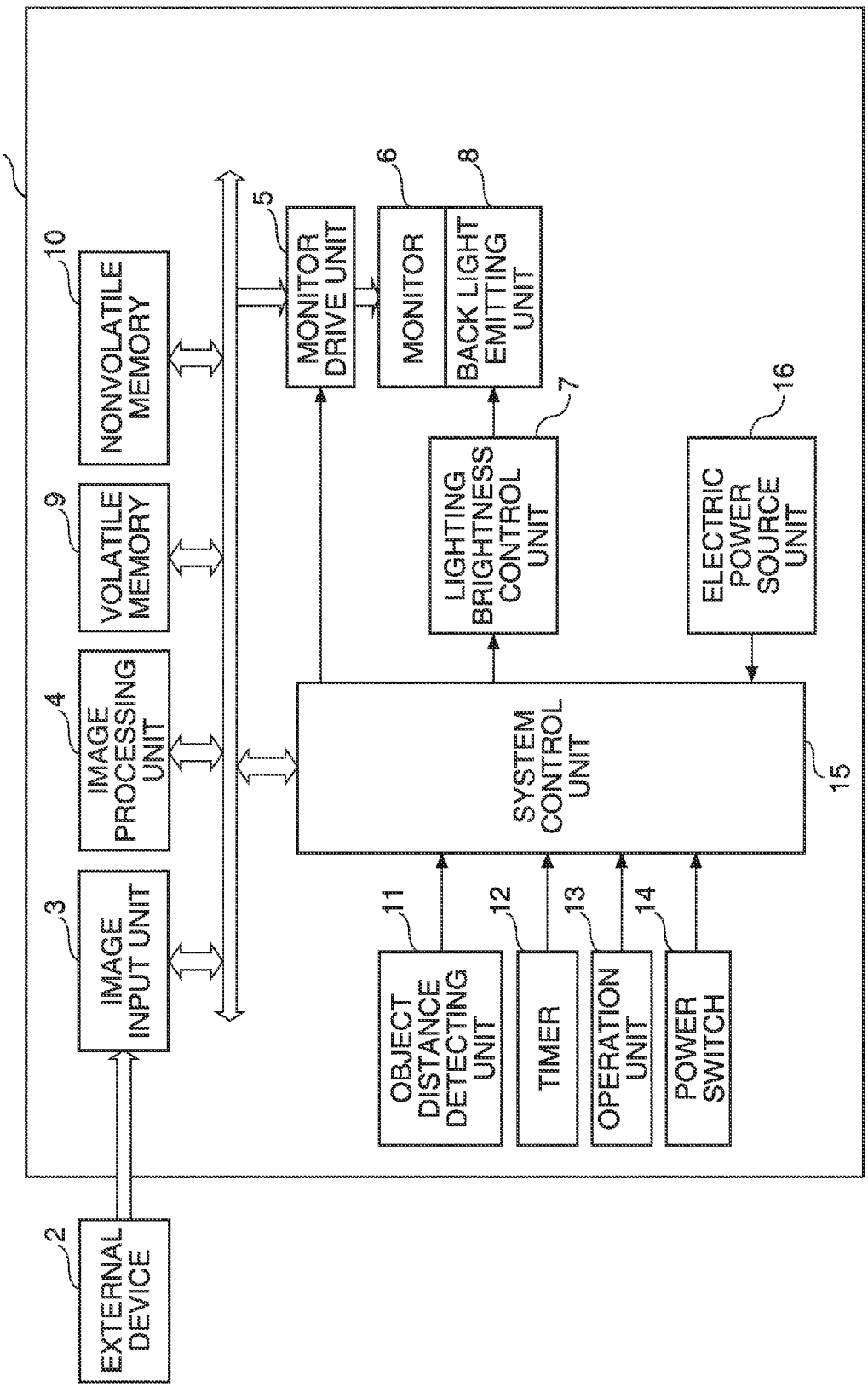
FIG. 1 is a block diagram schematically showing a configuration of a display apparatus according to a first embodiment of the present invention.

FIG. 1 is a block diagram schematically showing a configuration of a display apparatus 1 according to the first embodiment of the present invention. The display apparatus 1 is provided with a monitor 6, and displays an image signal input from an external device 2 on the monitor 6. A video output device, such as a personal computer (PC) and a digital camera, is employed as the external device 2. The external device 2 outputs an image signal to the display apparatus 1.

The display apparatus 1 is provided with an image input unit 3, an image processing unit 4, a monitor drive unit 5, a lighting brightness control unit 7, a back light emitting unit 8, a volatile memory 9, and a nonvolatile memory 10. Moreover, the display apparatus 1 is provided with an object distance detecting unit 11, a timer 12, an operation unit 13, a power switch 14, a system control unit 15, and an electric power source unit 16.

The image input unit 3 is connected with the external device 2 through a signal cable, and receives an image signal transmitted from the external device 2. The image signal input into the image input unit 3 is transmitted to the image processing unit 4. The image processing unit 4 is a calculation means that converts the image signal obtained from the image input unit 3 into a data format capable of displaying on the monitor 6. The image processing unit 4 outputs horizontal/vertical synchronizing signals and a dot clock signal to the monitor drive unit 5. Moreover, the image processing unit 4 applies various image processes, such as lightness adjustment, contrast adjustment, gamma correction, and color balance adjustment, to the image signal obtained from the image input unit 3.

The monitor drive unit 5 generates a driving timing signal for driving the monitor 6, and supplies it to the monitor 6. Moreover, the monitor drive unit 5 includes a voltage step-up circuit and a voltage step-down circuit for generating drive voltages for a display panel of the monitor 6. The monitor drive unit 5 generates various drive voltages and supplies them to the monitor 6 in synchronization with a generated driving timing signal.

The monitor 6 is an organic EL monitor or a liquid crystal monitor, for example. When the monitor 6 is a liquid crystal monitor, the monitor 6 has a transmissive liquid crystal panel with a TFT active matrix driven system. One pixel of a liquid crystal panel consists of three sub-pixels of RGB (Red, Green, and Blue). A color filter that consists of sections for three colors of RGB is arranged on the liquid crystal panel. A pair of polarizing filters that regulate an oscillating direction of light to one direction are respectively installed under the liquid crystal and over the color filter. The optical transmittance of the liquid crystal panel is controlled by coordinating the voltage applied to each sub pixel from the monitor drive unit 5, which adjusts the penetration of the light projected from the back light emitting unit 8, and displays gradations of a desired image.

The lighting brightness control unit 7 controls the lighting brightness of the back light emitting unit 8 in stages. The lighting brightness control unit 7 changes the lighting brightness linearly by controlling electric current applied to an illuminant of the back light emitting unit 8 according to a PWM control signal from the system control unit 15. The back light emitting unit 8 includes a light source, such as a LED, a fluorescence tube, and an organic EL, and a light guide plate, a reflector, a diffusor, etc. that cause surface emission of the light from the light source. The back light emitting unit 8 is fixed to the back side of the monitor 6, and illuminates the monitor 6 from the back side. The monitor (an LCD panel) 6 and the back light emitting unit (an illuminating device) 8 constitute the display unit.

The volatile memory 9 is a data rewritable semiconductor memory, such as an SRAM or a DRAM. A program stack area for the system control unit 15, a status storage area, an operation area, a working area, and an image display data area are reserved in the volatile memory 9. The nonvolatile memory 10 is an electrically erasable programmable memory, such as a flash memory. The nonvolatile memory 10 stores menu setting information and a control program for the display apparatus 1.Moreover, the nonvolatile memory 10 stores data required to constitute display image data, such as character font data, icon data, menu items, a menu background, and color palette information.

The object distance detecting unit 11 is installed on the display surface side of the display apparatus 1. The object distance detecting unit 11 has an infrared light emitting device and a photo detector, emits infrared light at certain time intervals, and detects whether there is a user at a predetermined position by detecting reflected light.

The timer 12 is used for system management of the display apparatus 1, such as measurement of shifting time to a sleep mode of the display apparatus 1 and measurement of predetermined time for performing an alarm notice etc. The operation unit 13 is provided with menu buttons for displaying a menu for various settings of the display apparatus 1. The menu buttons include buttons for changing brightness and color balance of an image display (screen). Moreover, the operation unit 13 includes a selection operation key, a decision button, and a cancel button that are used for selecting or canceling items in the menu displayed, and includes a sleep button for shifting to the sleep mode compulsorily, etc.

The power switch 14 switches between ON and OFF of the power of the display apparatus 1 according to an operation, and switches an operation mode of the display apparatus 1 among various modes in a power ON state. The system control unit 15 is a central processing unit (CPU) that controls overall operations of the display apparatus 1. The electric power source unit 16 supplies electric power required for each part that constitutes the display apparatus 1.

Figure 2:
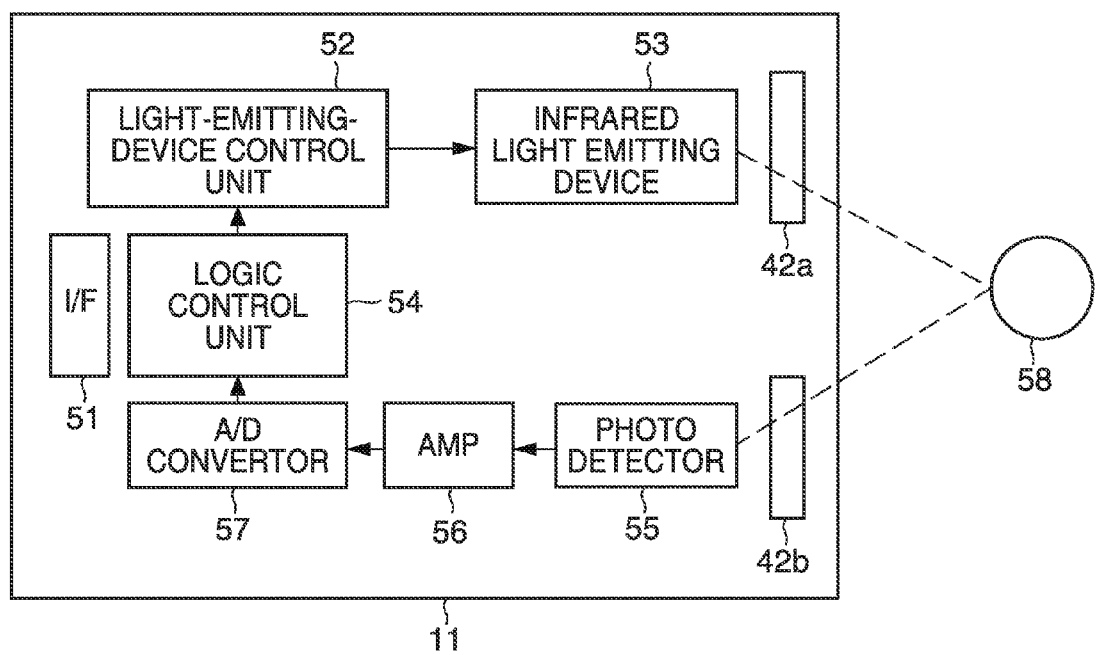
FIG. 2 is a block diagram schematically showing a configuration of an object distance detecting unit of the display apparatus in FIG. 1.

FIG. 2 is a block diagram schematically showing a configuration of the object distance detecting unit 11. The object distance detecting unit 11 is provided with an interface (I/F) 51, a light-emitting-device control unit 52, the infrared light emitting device 53, a logic control unit 54, the photo detector 55, an amplifier (AMP) 56, an A/D convertor 57, a light projecting lens window 42a, and a light receiving lens window 42b.

The interface 51 receives a control signal from the system control unit 15 of the display apparatus 1, and notifies the system control unit 15 of a detection result of the object distance detecting unit 11. The light-emitting-device control unit 52 controls an emission quantity of the infrared light emitting device 53. Specifically, the infrared light emitting device 53 is an infrared LED. The light-emitting-device control unit 52 supplies forward current of the infrared light emitting device 53 as constant current, and increases the emission quantity by increasing the forward current.

The infrared light emitting device 53 emits the infrared light with the current controlled by the light-emitting-device control unit 52. The emitted infrared light is projected towards the exterior through the light projecting lens window 42a. The logic control unit 54 generates a lighting timing and an extinction timing for the infrared light emitting device 53, and generates an accumulating timing and a reset timing for the photo detector 55. Moreover, the logic control unit 54 is able to set up a plurality of thresholds with respect to the output value of the A/D convertor 57 (hereinafter referred to as a "detection value S"). The thresholds are set up in order to determine a distance range in which a user 58 exists from among a plurality of distance ranges. The determination result of whether the detection value S exceeds a threshold is sent to the system control unit 15 of the display apparatus 1 through the interface 51.

The light projected outside through the light projecting lens window 42a is reflected by the user (object) 58. The dispersed reflection light from the user 58 is condensed through the light receiving lens window 42b, and is received by the photo detector 55. It should be noted that the user 58 is a user of the display apparatus 1. A person who approaches within the predetermined distance range from the display apparatus 1 is considered as a user. The photo detector 55 is a photoelectric conversion element like a CCD, for example. The photo detector 55 photoelectrically converts the received light, generates an analog electric signal corresponding to a light receiving amount, and sends it to the amplifier 56.

The amplifier 56 amplifies the analog electric signal obtained from the photo detector 55 with a predetermined gain. The A/D convertor 57 converts the analog electric signal obtained from the amplifier 56 into a digital signal, and outputs it as the detection value S to the logic control unit 54. The logic control unit 54 compares the detection value S from the A/D convertor 57 with the thresholds, and determines a distance range in which the user 58 exists from among the plurality of distance ranges from the display apparatus 1.

Figure 3:
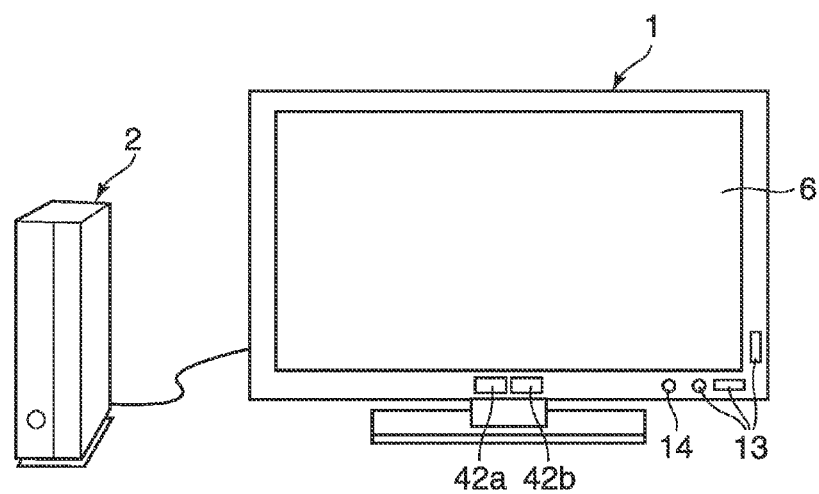
FIG. 3 is an external view showing the display apparatus in FIG. 1.

FIG. 3 is an external view showing the display apparatus 1. The reference numerals indicated in FIG. 3 correspond to the reference numerals indicated in FIG. 1 and FIG. 2. Accordingly, FIG. 3 shows that the display apparatus 1 is connected with the external device 2 through the wire and that the display apparatus 1 is provided with the monitor 6, the operation unit 13, the power switch 14, the light projecting lens window 42a, and the light receiving lens window 42b.

The light projecting lens window 42a and the light receiving lens window 42b are arranged at the side of the monitor 6 that is the display surface side. Accordingly, the object distance detecting unit 11 determines whether there is the user 58 at the display surface side of the display apparatus 1, and detects a distance range in which the user 58 exists.

As mentioned above, the logic control unit 54 of the object distance detecting unit 11 sets up a plurality of thresholds. The plurality of thresholds are equivalent to boundary values of a plurality of distance ranges into which distances between the display apparatus 1 and the user are divided. In this embodiment, the logic control unit 54 can set up at least two thresholds that are a first threshold TH1 and a second threshold TH2. That is, the object distance detecting unit 11 shall divide the area in which the user 58 can exist into at least three ranges.

The first threshold TH1 is equivalent to a first distance that is used for determining whether the user 58 who exists in front of the display apparatus 1 is in a range that is determined that the user uses the display unit 1 or in a range that is determined that the user does not use the display apparatus 1. The second threshold TH2 is equivalent to a second distance that is longer than the first distance and that is used for determining whether the user 58 is in a range that is determined that the user does not use the display apparatus 1 or is not in front of the display apparatus 1. Since the detection value S corresponds to the light receiving amount of the photo detector 55, it becomes larger as the user 58 approaches the display apparatus 1. Accordingly, the first threshold TH1 is larger than the second threshold TH2.

Figure 4:
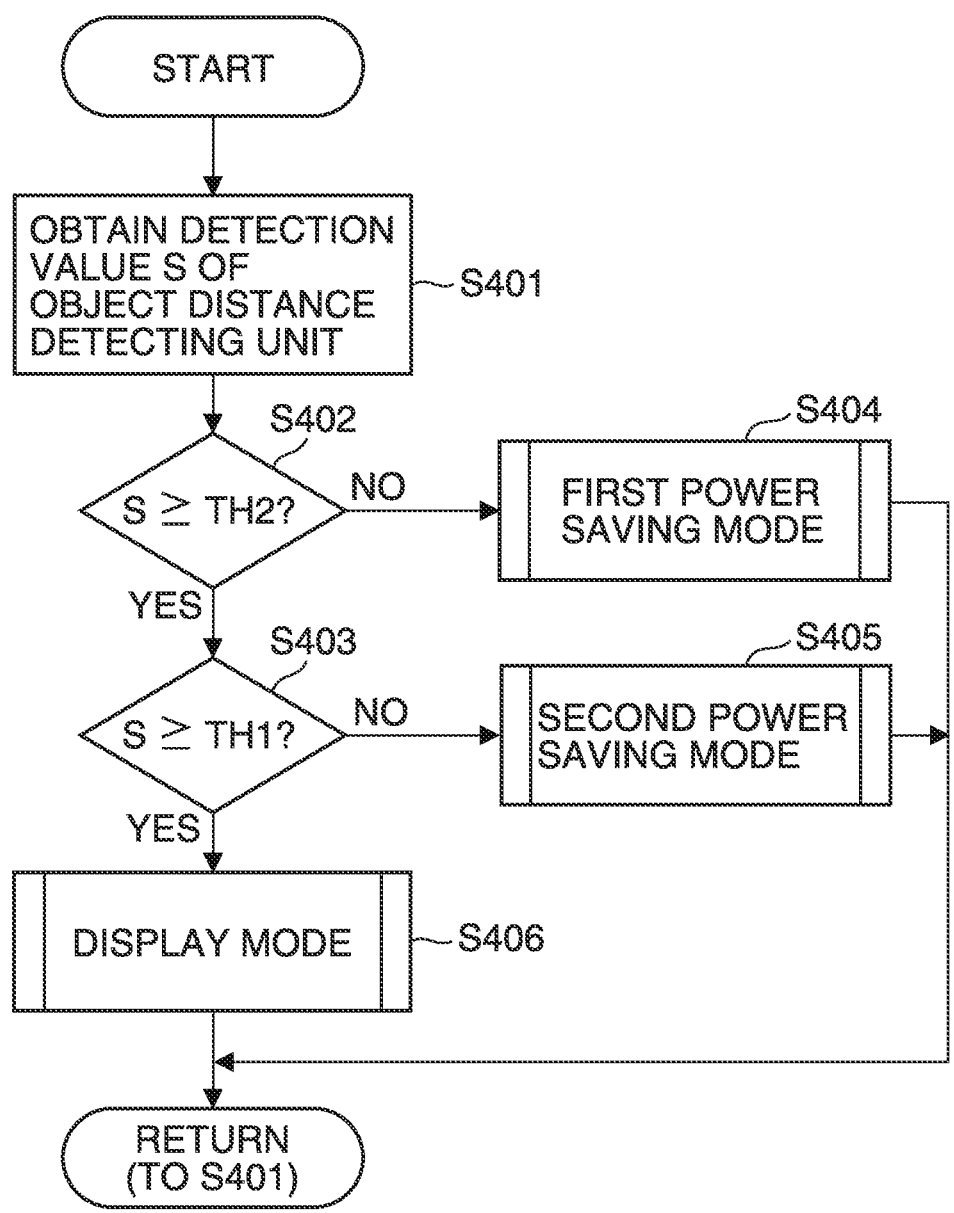
FIG. 4 is a flowchart showing a display control process performed by the display apparatus in FIG. 1.

Next, the display control for the monitor 6 performed by the display apparatus 1 will be described with reference to a flowchart. FIG. 4 is a flowchart showing a display control process performed by the display apparatus 1 in FIG. 1. Each process shown in the flowchart in FIG. 4 is achieved by the system control unit 15 that develops a predetermined program stored in the nonvolatile memory 10 to the volatile memory 9 and that controls an operation of each part constituting the display apparatus 1.

In step S401, the logic control unit 54 obtains the detection value S from the A/D convertor 57. Specifically, the infrared light emitting device 53 is lighted with a predetermined emission quantity according to a light emitting timing signal generated by the logic control unit 54. The photo detector 55 accumulates an electric charge in synchronization with this. The amplifier 56 amplifies the electric signal that is photoelectrically converted by the photo detector 55. Then, the A/D convertor 57 converts the amplified signal into the digital signal, and outputs the digital signal as the detection value S to the logic control unit 54.

In step S402, the logic control unit 54 determines whether the detection value S that is obtained in the step S401 is equal to or larger than the predetermined second threshold TH2. When the detection values S is equal to or larger than the second threshold TH2 (YES in the step S402), the logic control unit 54 proceeds with the process to step S403 without notifying the system control unit 15 of the determination result. On the other hand, when the detection value S is smaller than the second threshold TH2 (NO in the step S402), the logic control unit 54 notifies the system control unit 15 of the determination result, and herewith the process proceeds to step S404 that will be executed by the system control unit 15.

In the step S403, the logic control unit 54 determines whether the detection value S that is obtained in the step S401 is equal to or larger than the predetermined first threshold TH1. When the detection value S is smaller than the first threshold TH1 (NO in the step S403), the logic control unit 54 notifies the system control unit 15 of the determination result, and herewith the process proceeds to step S405 that will be executed by the system control unit 15. On the other hand, when the detection value S is equal to or larger than the first threshold TH1 (YES in the step S403), the logic control unit 54 notifies the system control unit 15 of the determination result, and herewith the process proceeds to step S406 that will be executed by the system control unit 15.

In the step S404, the system control unit 15 sets the display apparatus 1 to a first power saving mode as a subroutine process. In step S405, the system control unit 15 sets the display apparatus 1 to a second power saving mode as a subroutine process. In step S406, the system control unit 15 sets the display apparatus 1 to a display mode as a subroutine process. The system control unit 15 returns the process to the step S401 after finishing the steps S404 to S406.

The first power saving mode is smaller than the second power saving mode in the power consumption, and is the mode driven with power consumption as low as possible. In the first power saving mode, the electric power source unit 16 supplies only the electric power required for an operation of the object distance detecting unit 11, and other unnecessary electric supply is stopped. Accordingly, the monitor 6 does not display an image. Moreover, the object distance detecting unit 11 performs the processes in the steps S401 to S403 independently within the display apparatus 1, and notifies the system control unit 15 of the determination result if needed. Accordingly, when there is no notification of the determination result from the object distance detecting unit 11, the system control unit 15 operates with a low speed clock required to detect the notification of the determination result from the object distance detecting unit 11.

The second power saving mode is larger than the first power saving mode in the power consumption, and is smaller than a display mode for displaying in the power consumption. Moreover, shifting time from the second power saving mode to the display mode is shorter than shifting time from the first power saving mode to the display mode. In the second power saving mode, although the electric power source unit 16 generates voltage required for the display panel and the back light in order to display an image on the monitor 6 of the display apparatus 1, the display panel is not driven and the back light is not lighted. Accordingly, since an image is not displayed in the second power saving mode, the power consumption in the second power saving mode is smaller than that in the display mode. On the other hand, since the voltage required to drive the display panel and the back light is generated in the second power saving mode, the monitor 6 is able to start displaying an image immediately.

The display mode is a mode in which an image is displayed on the monitor 6. In the display mode, the monitor drive unit 5 supplies the driving timing signal for driving the monitor 6 to the monitor 6, and the drive voltage is applied to the display panel of the monitor 6. Moreover, the back light starts lighting in the back light emitting unit 8. Accordingly, a desired image is displayed on the monitor 6.

Figure 5A:
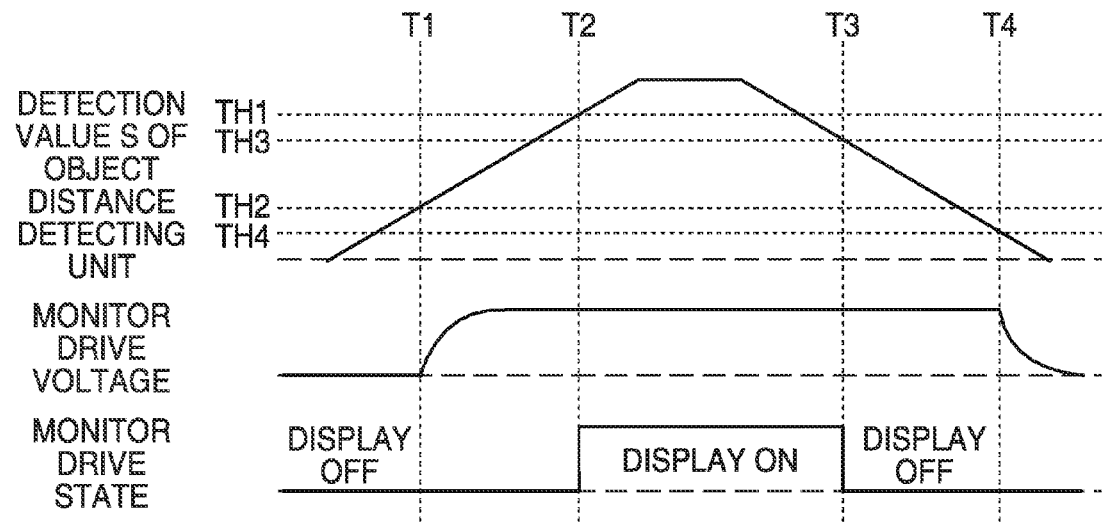
FIG. 5A is a timing chart showing the display control process performed by the display apparatus in FIG. 1.
Figure 5B:
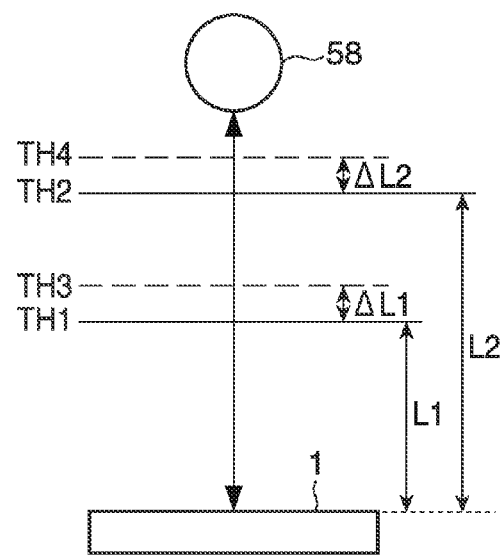
FIG. 5B is a view schematically showing a relation between a distance between an object and the display unit and a detection threshold.

Next, the display control process (the processes in the steps S401 to 406) performed with the display apparatus 1 will be described with reference to a timing chart. FIG. 5A is a timing chart showing the display control process performed with the display apparatus 1, and shows temporal changes of the detection value S, monitor drive voltage, and a monitor display state. FIG. 5B is a view schematically showing a relation among the distance between the user 58 and the front side (the arrangement surface of the monitor 6) of the display apparatus 1, the first threshold TH1, and the second threshold TH2. FIG. 5B shows that the detection value S becomes equal to the first threshold TH1 when the distance between the user 58 and the display apparatus 1 is L1, and that the detection value S becomes equal to the second threshold TH2 when the distance between the user 58 and the display apparatus 1 is L2.

In FIG. 5A, the user 58 is at a position more distant than the distance L2 from the display apparatus 1 (i.e., the user 58 is at a distance that is determined that the user does not exist in front of the display apparatus 1) before a timing T1. Accordingly, the detection value S is smaller than the second threshold TH2, and the display apparatus 1 is in the first power saving mode. Since the display apparatus 1 enters into the first power saving mode when the user 58 is not in front of the display apparatus 1, the power consumption is reduced as much as possible.

When the user 58 approaches a position where the distance from the display apparatus 1 becomes L2 at the timing T1, the detection value S becomes equal to or larger than the second threshold TH2. Since the user 58 is at the position more distant than the distance L1 from the display apparatus 1 at this time, it is determined that the user 58 does not use the display apparatus 1, and an image is not displayed. However, a possibility of using the display apparatus 1 becomes high. Accordingly, the display apparatus 1 shifts to the second power saving mode from the first power saving mode when the detection value S becomes equal to or larger than the second threshold TH2. This enables to display an image immediately when the user 58 further approaches the display apparatus 1.

When the user 58 approaches a position where the distance from the display apparatus 1 becomes L1 at a timing T2, the detection value S becomes equal to or larger than the first threshold TH1. Since it is determined that the user 58 uses the display apparatus 1 at this time, the display apparatus 1 shifts to the display mode from the second power saving mode. Since the display apparatus 1 is in the second power saving mode before shifting to the display mode, an image is immediately displayed.

When the user 58 goes away from the display apparatus 1, an operation control contrary to the case where the user 58 approaches the display apparatus 1 can be performed. However, the operation control is not restricted to this. Thresholds used in the case where the user 58 goes away from the display apparatus 1 may be different from thresholds used in the case where the user 58 approaches the display apparatus 1. FIG. 5A shows the example in which a third threshold TH3 and a fourth threshold TH4 are used when the user 58 goes away from the display apparatus 1.

When the user 58 goes away from the display apparatus 1 and the user 58 moves to a position where a distance from the display apparatus 1 is longer than the distance L1 by a predetermined distance $\Delta L1$ at a timing T3, the detection value S becomes smaller than the third threshold TH3. It should be noted that a relationship of $L1+\Delta L1<L2$ holds, and the third threshold TH3 is smaller than the first threshold TH1 and is larger than the second threshold TH2. When the detection value S becomes smaller than the third threshold TH3, the display apparatus 1 shifts to the second power saving mode from the display mode. Thus, since the threshold used when the user 58 approaches the display apparatus 1 is different from the threshold used when the user 58 goes away from the display apparatus 1 (there is hysteresis), frequent switching of the operation mode of the display apparatus 1 is prevented when the user 58 exists near a position corresponding to a threshold.

When the user 58 goes away from the display apparatus 1 and the user 58 moves to a position where a distance from the display apparatus 1 is longer than the distance L2 by a predetermined distance $\Delta L2$ at a timing T4, the detection value S becomes smaller than the fourth threshold TH4. The fourth threshold TH4 is smaller than the second threshold TH2. When the detection value S becomes smaller than the fourth threshold TH4, the display apparatus 1 shifts to the first power saving mode from the second power saving mode.

As described above, the first embodiment reduces the power consumption as much as possible (the first power saving mode) under the condition where it is determined that the user 58 does not exist in front of the display apparatus 1. Moreover, when the user 58 exists in front of the display apparatus 1 but is at a distance that is determined that the display apparatus 1 is not used, a condition that enables to display an image immediately is achieved while reducing the power consumption (the second power saving mode). This enables to display an image immediately when the user 58 approaches within a distance range that is determined that the display apparatus 1 is used.

Figure 6:
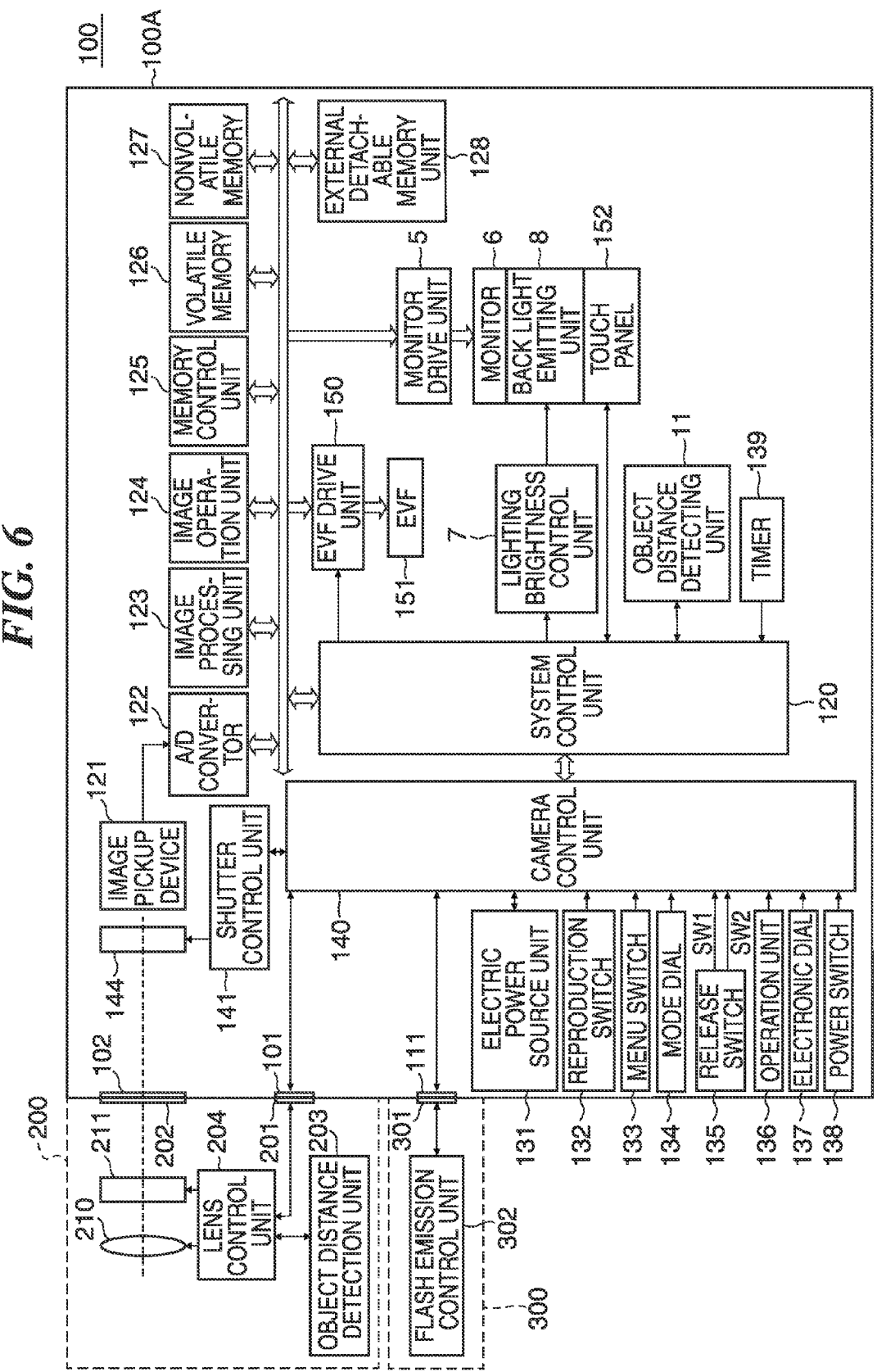
FIG. 6 is a block diagram schematically showing a configuration of an image pickup apparatus according to a second embodiment of the present invention.

FIG. 6 is a block diagram schematically showing a configuration of an image pickup apparatus 100 according to a second embodiment of the present invention. Specifically, the image pickup apparatus 100 is a lens-unit-exchangeable image pickup apparatus (a digital single lens reflex camera).

The image pickup apparatus 100 consists of a camera body 100A, a lens unit 200, and a flash unit 300. The lens unit 200 is detachable and attachable to the camera body 100A by a lens mount 102 of the camera body 100A and a lens mount 202 of the lens unit 200. The flash unit 300 is detachable and attachable to the camera body 100A by an accessory shoe 111 of the camera body 100A and a connector 301 of the flash unit 300. It should be noted that the accessory shoe 111 serves as a function of a connector that electrically connects the flash unit 300 to the camera body 100A.

The camera body 100A is provided with the monitor drive unit 5, the monitor 6, the lighting brightness control unit 7, the back light emitting unit 8, and the object distance detecting unit 11. Since these units have the same functions as the units of the display apparatus 1 described in the first embodiment, their descriptions are omitted.

The camera body 100A is provided with a shutter control unit 141, a shutter 144, an image pickup device 121, an A/D convertor 122, an image processing unit 123, an image operation unit 124, a memory control unit 125, a volatile memory 126, a nonvolatile memory 127, and an external detachable memory unit 128. Moreover, the camera body 100A is provided with a system control unit 120, an EVF (Electronic View Finder) 151, an EVF drive unit 150, a timer 139, and a touch panel 152. Furthermore, the camera body 100A is provided with an electric power source unit 131, a reproduction switch 132, a menu switch 133, a mode dial 134, a release switch 135, an operation unit 136, an electronic dial 137, a power switch 138, and a camera control unit 140.

The lens unit 200 is provided with a lens 210, a diaphragm 211, an object distance detection unit 203, and a lens control unit 204. In a state where the lens unit 200 is attached to the camera body 100A, the connector 201 of the lens unit 200 is electrically connected with the connector 101 of the camera body 100A, which enables communication between the lens control unit 204 and the camera control unit 140.

The flash unit 300 is provided with a light source (not shown) and a flash emission control unit 302 that controls emission of the light source. In a state where the flash unit 300 is attached to the accessory shoe 111 of the camera body 100A, the connector 301 of the flash unit 300 is electrically connected with the accessory shoe 111 of the camera body 100A, which enables communication between the flash emission control unit 302 and the camera control unit 140.

Light from an object passes through the lens unit 200 and the shutter 144, and forms an image on the image pickup device 121. The image pickup device 121 converts the formed optical image into analog electric signals, and outputs the signals to the A/D convertor 122. The A/D convertor 122 converts the analog electric signals obtained from the image pickup device 121 into image data that consists of digital signals. The image data output from the A/D convertor 122 is written in the volatile memory 126 through the memory control unit 125 or through the image processing unit 123 and the memory control unit 125.

The image processing unit 123 applies predetermined image processes, such as a pixel interpolation process and a color conversion process, to the image data output from the A/D convertor 122, or the image data read from the volatile memory 126 by the memory control unit 125. Moreover, the image processing unit 123 is provided with a compressing expanding circuit that compresses and expands the image data by an adaptation discrete cosine transform (ADCT) etc. The image processing unit 123 applies a compression process or an expansion process to the image data read from the volatile memory 126, and writes the image data after processing into the volatile memory 126. Furthermore, the image processing unit 123 generates display image data for the monitor 6 and the EVF 151, and applies various image processes, such as lightness adjustment, contrast adjustment, gamma correction, and color balance adjustment.

The image operation unit 124 computes a contrast value of a photographed image, and measures a focusing state to an object on the basis of the contrast value in order to perform an autofocus (AF) process. Moreover, the image operation unit 124 measures an exposure state from a photographed image in order to perform an automatic exposure (AE) process.

The memory control unit 125 controls transmission and reception of data among the A/D convertor 122, the image processing unit 123, the monitor drive unit 5, the EVF drive unit 150, the external detachable memory unit 128, and the volatile memory 126.

The touch panel 152 is installed on the monitor 6. There is no limitation in a touch operation detection system to the touch panel 152. For example, a resistance film method, a capacitive sensing method, an optical method, etc. may be used. The system control unit 120 controls the whole image pickup apparatus 100.

The volatile memory 126 temporarily stores a still image and a video image photographed, and data of an image for reproduction display. The volatile memory 126 has memory capacity that is sufficient for storing the predetermined number of still images and video images. It should be noted that a program stack area for the system control unit 120, a status storage area, an operation area, a working area, and an image display data area are reserved in the volatile memory 126. Various kinds of calculations in the image pickup apparatus 100 are executed by the system control unit 120 using the operation area of the volatile memory 126.

The nonvolatile memory 127 is an electrically erasable programmable semiconductor memory, such as a flash memory and an EEPROM. The nonvolatile memory 127 stores photographing parameters set in the image pickup apparatus 100, programs that control operations of the image pickup apparatus 100, etc. The external detachable memory unit 128 is a Compact Flash (registered trademark) or an SD card, etc. which can be attached to and detached from the camera body 100A, and has memory capacity that is sufficient for storing image data of photographed still images and video images.

The electric power source unit 131 has a battery, a battery detector, a DC-DC converter, a switching circuit that changes conducting blocks, etc. The electric power source unit 131 controls the DC-DC converter on the basis of a detection result by the battery detector and an instruction from the camera control unit 140 so as to supply required voltages to the blocks during a required period. Moreover, the electric power source unit 131 detects whether the battery is loaded, the type of the battery, and battery residue.

The camera control unit 140 controls a series of image pickup operations in the image pickup apparatus 100 by transmitting and receiving control signals with the shutter control unit 141, the lens control unit 204, and the flash emission control unit 302. Moreover, the camera control unit 140 controls the power of the whole image pickup apparatus 100 and the change of the operation mode of the image pickup apparatus 100. The shutter control unit 141 controls an operation of the shutter 144 on the basis of the exposure information obtained from the image operation unit 124 while cooperating with the lens control unit 204 that controls the diaphragm 211.

The reproduction switch 132 is used to set the image pickup apparatus 100 to a reproduction display mode in which image data is displayed on the monitor 6, and is operated when reproducing and displaying the image file stored in the external detachable memory unit 128. On the contrary, when the image pickup apparatus 100 is in the reproduction display mode and the reproduction switch 132 is operated, the mode of the image pickup apparatus 100 is changed from the reproduction display mode to a photographing mode.

The menu switch 133 is used to display a list of various items as a menu on the monitor 6. The items of the menu contain a setting of the photographing parameters, formatting of the external detachable memory unit 128, a setting of a clock, a setting of a development parameter, a setting of a user function (a setting of a custom function), etc.

The photographing mode is changed by operating the mode dial 134. The photographing mode includes an automatic mode, a program mode, a shutter speed priority mode, an aperture priority mode, a manual mode, a portrait mode, a scenery mode, a sport mode, a night view mode, a dynamic image mode, etc. However, the photographing modes are not limited to them.

The release switch 135 has a switch SW1 that turns ON by half press of a release button and a switch SW2 that turns ON by full press of the release button. When the switch SW1 turns ON, operations of an AF process, an AE process, an automatic white balance (AWB) process, a flash light control (EF) process, etc. start. When the switch SW2 turns ON, a series of image pickup processes are performed. Specifically, a signal is read from the image pickup device 121, image data is written in the volatile memory 126 through the A/D convertor 122 and the memory control unit 125, and the processing procedures are performed by the image processing unit 123. Moreover, the image data read from the volatile memory 126 is compressed by the image processing unit 123, and the compressed image data is written in the external detachable memory unit 128.

Exposure conditions, such as shutter speed and an aperture value, can be set up by operating the electronic dial 137. The power switch 138 is used to change ON and OFF of the power of the image pickup apparatus 100, and to change a still image photographing mode and a video image taking mode. Moreover, the power switch 138 is able to change ON/OFF of the power of various kinds of attachments, such as the lens unit 200, the flash unit 300, the external detachable memory unit 128, etc., which are connected to the image pickup apparatus 100.

The operation unit 136 consists of various buttons and switches except the above-mentioned switches, such as the reproduction switch 132, shown in FIG. 6. The operation unit 136 is provided with buttons and switches that are used for setting and resetting a consecutive mode and a macro mode, for paging, for setting emission of the flash, for moving in the menu, for selecting white balance, photographing image quality, and exposure correction, for setting date and time, etc. Moreover, the operation unit 136 includes a switch that changes start and stop of live view photographing, moving switches for moving in a displayed menu in vertical and horizontal directions to select an item, and a switch for changing a zoom magnification of a reproducing image. Furthermore, the operation unit 136 includes an ON/OFF switch for quick review that automatically displays a photographed image immediately after photographing, a switch for eliminating a reproducing image, an ON/OFF switch for the image display on the EVF 151 and the monitor 6. The EVF 151 is equivalent to the first display unit. Moreover, the monitor (an LCD panel) 6 and the back light emitting unit (an illuminating device) 8 constitute the second display unit.

It should be noted that the operation unit 136 includes a switch that selects one of a compression mode in which a compression file, such as a JPEG file and an MPEG file, is written in the external detachable memory unit 128 and a RAW mode in which the output signal from the image pickup device 121 is digitized and written as is in the external detachable memory unit 128. In addition, the operation unit 136 includes an AF mode setting switch that selects one of a one shot AF mode in which a condition when the lens is focused first after the switch SW1 turns ON is kept and a servo AF mode in which an AF operation is continuously repeated according to an object position while the switch SW1 keeps ON.

The timer 139 has a clock function, a calendar function, a timer counter function, and an alarm function, and is used for the system management that manages shifting time to a sleep mode and an alarm notice, etc. The EVF drive unit 150 supplies the driving timing signal for driving the EVF 151. Moreover, the EVF drive unit 150 incorporates a voltage step-up circuit and a voltage step-down circuit for generating the drive voltage for the EVF 151, and supplies the generated drive voltage to the EVF 151 in synchronization with the drive timing signal.

The EVF 151 may employ an organic EL type or a liquid crystal type. For example, if the EVF 151 employs the organic EL type, an organic EL panel of a TFT active matrix driven system is built in. One pixel of the organic EL panel consists of three organic EL sub-pixels of RGB, and emits light by applying voltage to an organic EL sub-pixel. The emission quantity of each color can be controlled by controlling the voltage value applied to each organic EL sub-pixel from the EVF drive unit 150, which enables to display gradations of a desired image.

A menu screen, an image file, a live view screen, etc. are able to be displayed on the EVF 151 as with the monitor 6 under the control of the system control unit 120. Display on the monitor 6 and display on the EVF 151 are independently turned ON and OFF by the operation unit 136. On the other hand, a simultaneous display is also possible. Moreover, the image pickup apparatus 100 changes the display of the EVF 151 and the monitor 6 according to a detection result of the object distance detecting unit 11, as mentioned later with reference to FIG. 7 and FIG. 8.

The lens control unit 204 of the lens unit 200 controls the whole lens unit 200. The lens control unit 204 is provided with a memory that stores constants, variables, and programs for an operation, functional information, such as intrinsic identification information about the lens unit 200, management information, an open-aperture value, a minimum aperture value, and focal length, current and past setting values, etc. Moreover, the lens control unit 204 controls the position of the lens 210 for focusing according to the focusing state on the object measured by the image operation unit 124 (AF operation), and controls the positions of the diaphragm 211 and the lens 210 for zooming.

The connector 301 of the flash unit 300 allows the flash unit 300 to be mechanically attached to and detached from the accessory shoe 111, and functions as an interface that electrically connects the image pickup apparatus 100 to the flash unit 300. The flash emission control unit 302 controls the whole flash unit 300. For example, the flash emission control unit 302 performs an EF control process by controlling emission quantity and light-emitting timing of the light emitting section, which is a xenon tube or a LED (not shown), on the basis of the exposure information from the image operation unit 124.

Figure 7:
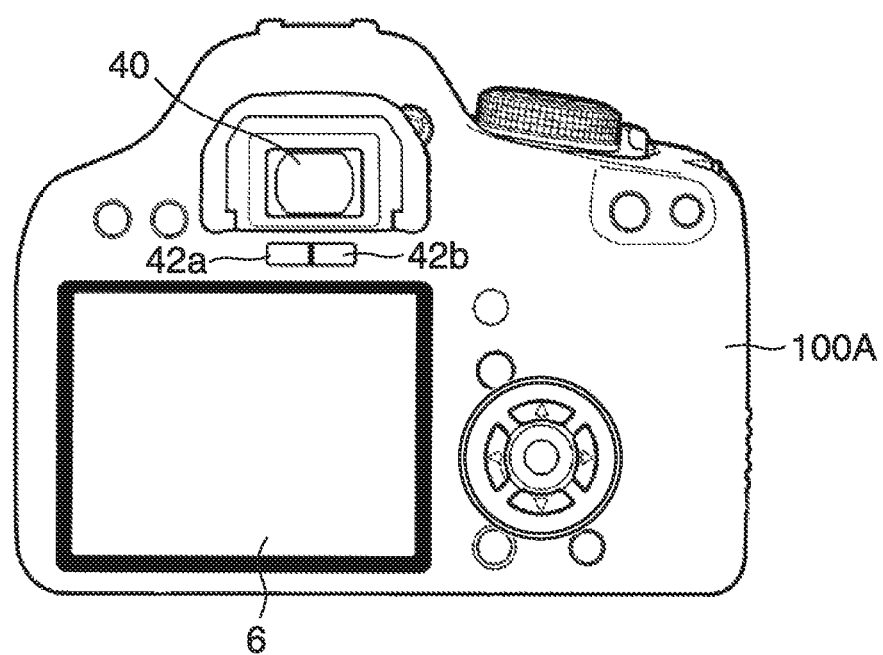
FIG. 7 is a rear view showing the image pickup apparatus in FIG. 6.

FIG. 7 is a rear view showing the image pickup apparatus 100. The reference numerals shown in FIG. 7 correspond to the reference numerals shown in FIG. 6. A finder 40, the monitor 6, a light projecting lens window 42a, and a light receiving lens window 42b are arranged on the rear side of the image pickup apparatus 100.

The EVF 151 is installed inside the finder 40. Since the light projecting lens window 42a and the light receiving lens window 42b are components of the object distance detecting unit 11 and have been already described with reference to FIG. 2, their descriptions are omitted. Since the monitor 6 has been already described with reference to FIG. 1, its description is also omitted.

Since the light projecting lens window 42a and the light receiving lens window 42b are installed near the finder 40, approach of a user 58 (see FIG. 9) to the finder 40 can be detected. That is, the object distance detecting unit 11 detects the distance to the user 58 from the EVF 151. When the distance from the EVF 151 to the user 58 is shorter than a predetermined distance, it is determined that the user 58 uses the finder 40 without looking at the monitor 6.

It can be also considered that the light projecting lens window 42a and the light receiving lens window 42b are arranged near the monitor 6 in the image pickup apparatus 100, and there is no difference between the position of the finder 40 and the position of the monitor 6 in an optical axis direction. Accordingly, the object distance detecting unit 11 may be configured to detect the distance from the monitor 6 to the user 58. Even in this case, when the distance from the monitor 6 to the user 58 is shorter than the predetermined distance, it is determined that the user 58 uses the finder 40 without looking at the monitor 6.

As with the first embodiment, the logic control unit 54 of the object distance detecting unit 11 is able to set up a plurality of thresholds, and shall be able to set up at least three thresholds (i.e., four distance ranges) in the second embodiment. A first threshold TH11 among the three thresholds corresponds to a first distance that is used to determine whether the user 58 uses the finder 40. A second threshold TH12 corresponds to a second distance that is an approximately intermediate distance between the first distance corresponding to the first threshold TH11 and a third distance corresponding to a third threshold TH13. The third threshold TH13 corresponds to the third distance that is determined that the user 58 is checking an image using the monitor 6.

Figure 8:
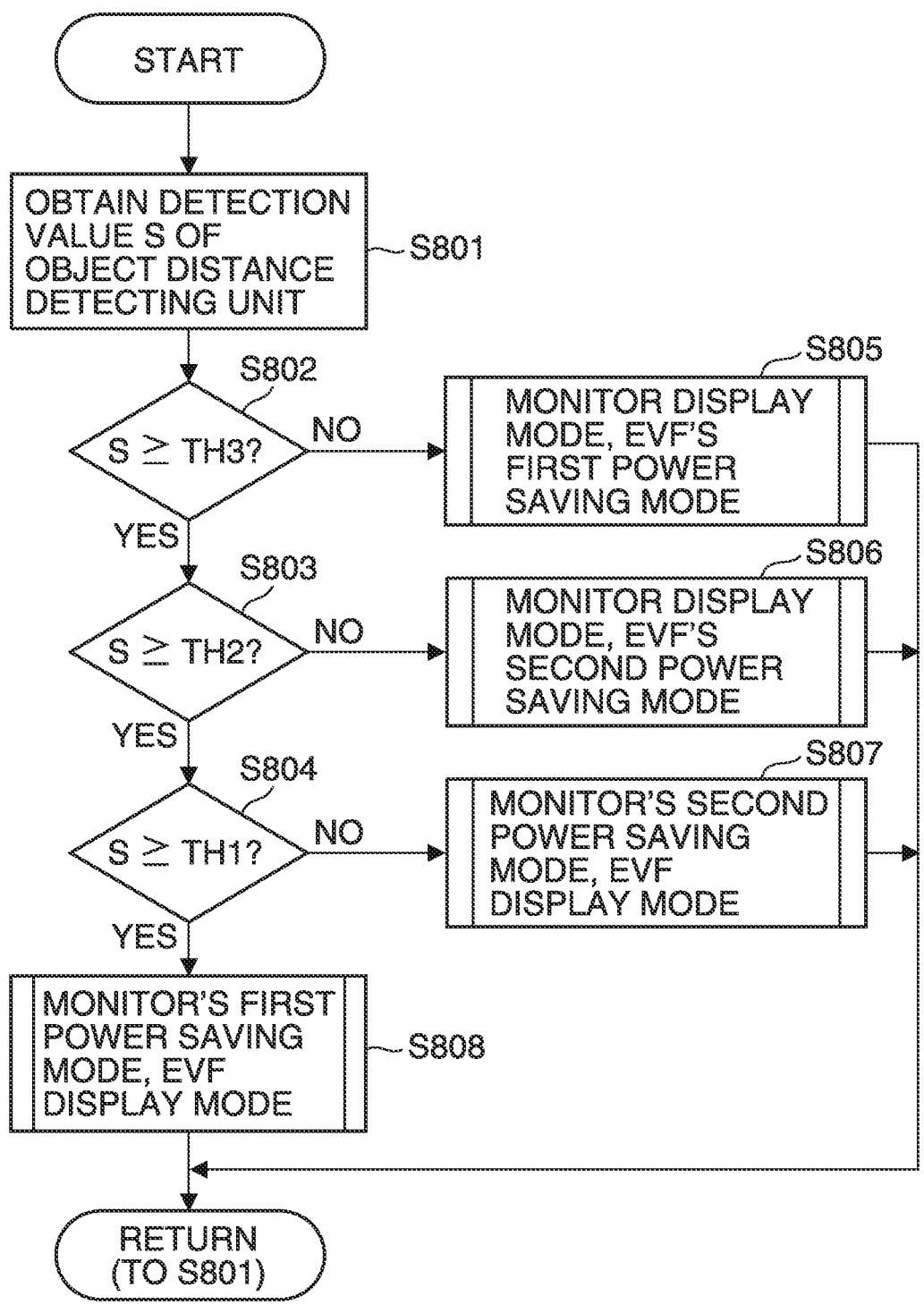
FIG. 8 is a flowchart showing a display control process performed by the image pickup apparatus in FIG. 6.

Next, a display control process performed by the image pickup apparatus 100 will be described with reference to a flowchart. FIG. 8 is a flowchart showing the display control process performed by the image pickup apparatus 100. Each process shown flowchart in the in FIG. 8 is achieved by the system control unit 120 that develops a predetermined program stored in the nonvolatile memory 127 to the volatile memory 126 and that controls an operation of each part constituting the image pickup apparatus 100.

In step S801, the logic control unit 54 of the object distance detecting unit 11 obtains the detection value S from the A/D convertor 57. Since this process is the same as the process in the step S401 in FIG. 4, its detailed description is omitted. In step S802, the logic control unit 54 determines whether the detection value S that is obtained in the step S801 is equal to or larger than the third threshold TH13. When the detection values S is equal to or larger than the third threshold TH13 (YES in the step S802), the logic control unit 54 proceeds with the process to step S803 without notifying the system control unit 120 of the determination result. On the other hand, when the detection value S is smaller than the third threshold TH13 (NO in the step S802), the logic control unit 54 notifies the system control unit 120 of the determination result, and herewith the process proceeds to step S805 that will be executed by the system control unit 120.

In the step S803, the logic control unit 54 determines whether the detection value S that is obtained in the step S801 is equal to or larger than the second threshold TH12. When the detection values S is equal to or larger than the second threshold TH12 (YES in the step S803), the logic control unit 54 proceeds with the process to step S804 without notifying the system control unit 120 of the determination result. On the other hand, when the detection value S is smaller than the second threshold TH12 (NO in the step S803), the logic control unit 54 notifies the system control unit 120 of the determination result, and herewith the process proceeds to step S806 that will be executed by the system control unit 120.

In the step S804, the logic control unit 54 determines whether the detection value S that is obtained in the step S801 is equal to or larger than the first threshold TH11. When the detection value S is smaller than the first threshold TH11 (NO in the step S804), the logic control unit 54 notifies the system control unit 120 of the determination result, and herewith the process proceeds to step S807 that will be executed by the system control unit 120. On the other hand, when the detection value S is equal to or larger than the first threshold TH11 (YES in the step S804), the logic control unit 54 notifies the system control unit 120 of the determination result, and herewith the process proceeds to step S808 that will be executed by the system control unit 120.

In the step S805, the system control unit 120 sets the monitor 6 to a monitor display mode (the display mode of the monitor 6) and sets the EVF 151 to an EVF's first power saving mode (the first power saving mode of the EVF 151) as a subroutine process. In the monitor display mode, the monitor drive unit 5 supplies a driving timing signal to the monitor 6, a drive voltage is applied to the display panel of the monitor 6, and the back light emitting unit 8 lights the back light. That is, the monitor 6 displays a desired image and a touch-operation detecting function of the touch panel 152 becomes available in the monitor display mode.

In the EVF's first power saving mode, all the electric power supply required for the display operation of the EVF 151 is stopped, and the power consumption concerning the display operation of the EVF 151 is reduced as much as possible. Specifically, the electric power supply to the EVF drive unit 150 is stopped, and accordingly, generation of the electric power required to drive the display panel of the EVF 151 is also stopped.

In the step S805, the system control unit 120 sets the monitor 6 to the monitor display mode and sets the EVF 151 to an EVF's second power saving mode (the second power saving mode of the EVF 151) as a subroutine process. In the EVF's second power saving mode, although the electric power required to drive the display panel of the EVE 151 is generated, the display panel is not driven. Accordingly, the power consumption in the EVF's second power saving mode becomes larger than the power consumption in the EVF's first power saving mode, but becomes smaller than the power consumption in an EVF display mode (the display mode of the EVF 151) because the display panel is not lighted. Moreover, since the electric power required to drive the display panel of the EVF 151 is generated in the EVF's second power saving mode, the shifting time to the EVF display mode from the EVF's second power saving mode is shorter than the shifting time to the EVF display mode from the EVF's first power saving mode, which enables to display an image on the EVF 151 immediately.

In the step S807, the system control unit 120 sets the monitor 6 to a monitor's second power saving mode (the second power saving mode of the monitor 6) and sets the EVF 151 to the EVF display mode as a subroutine process. In the monitor's second power saving mode, although all the electric power required to display an image on the monitor 6 is generated, the display panel is not driven and the back light is not lighted. Accordingly, the power consumption in the monitor's second power saving mode becomes smaller than the monitor display mode in which the display panel is driven and the back light is lighted. On the other hand, since all the electric power required to display an image on the monitor 6 is generated in the monitor's second power saving mode, the monitor is able to shift to the monitor display mode immediately.

It should be noted that the touch panel 152 is not used in the monitor's second power saving mode because the monitor 6 is in a non-display state. Accordingly, the drive of the touch panel 152 is stopped and the function for detecting a touch operation to the touch panel 152 is invalidated in the monitor's second power saving mode. This further reduces the power consumption. In the EVF display mode, the driving timing signal is supplied to the EVF 151 from the EVF drive unit 150 and the drive voltage is applied to the display panel. That is, the EVF 151 displays a desired image in the EVF display mode.

In the step S808, the system control unit 120 sets the monitor 6 to a monitor's first power saving mode (the first power saving mode of the monitor 6) and sets the EVF 151 to the EVF display mode as a subroutine process. In the monitor's first power saving mode, all the electric power supply required for the display operation of the monitor 6 is stopped, and the power consumption concerning the display operation of the monitor 6 is reduced as much as possible. Specifically, the generation of the drive voltage for the monitor 6, the electric power supply to the monitor drive unit 5, the generation of the drive voltage for the back light emitting unit 8, the electric power supply to the lighting brightness control unit 7, and the drive of the touch panel 152 are stopped in the monitor's first power saving mode.

The system control unit 120 returns the process to the step S801 after finishing each of the steps S805 to S808.

Figure 9A:
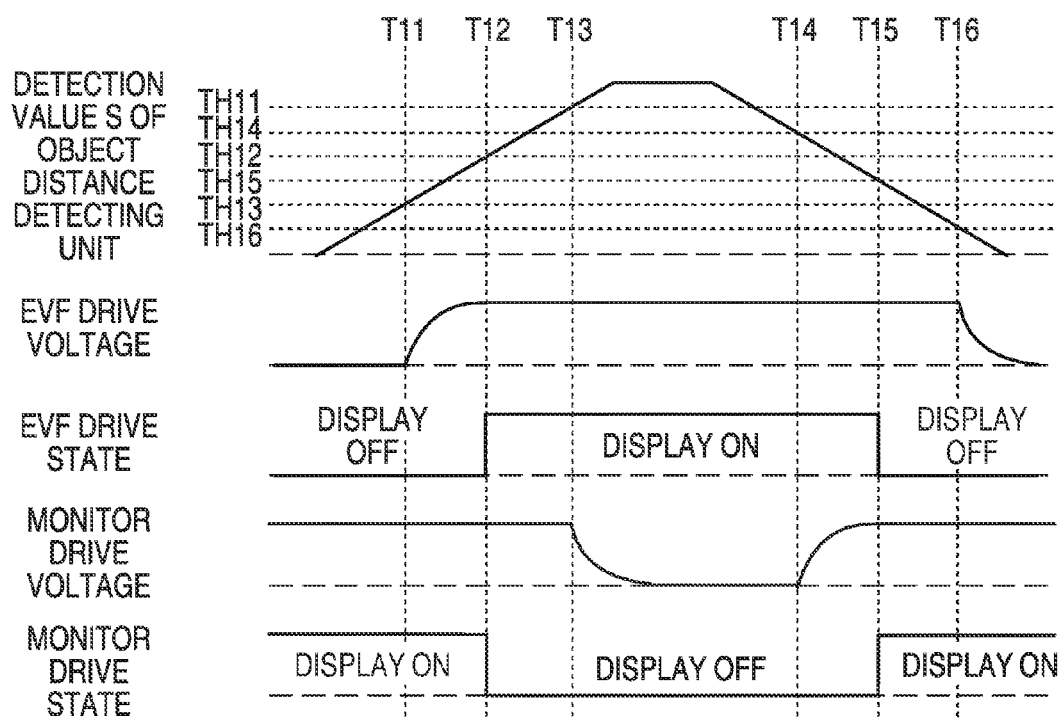
FIG. 9A is a timing chart showing the display control process performed by the image pickup apparatus in FIG. 6.
Figure 9B:
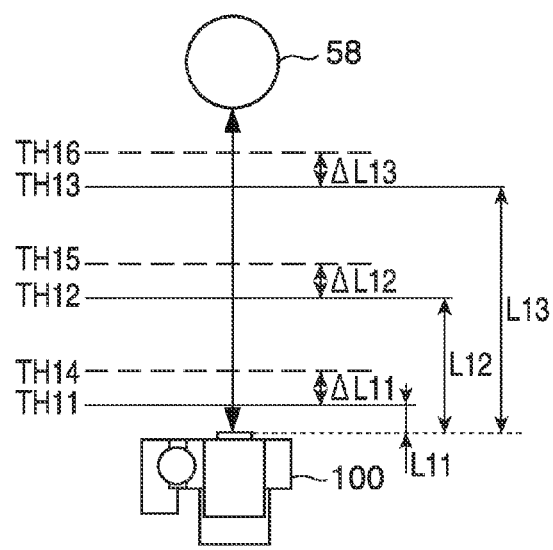
FIG. 9B is a view schematically showing a relation between a distance between an object and the image pickup apparatus and a detection threshold.

Next, the display control process (the processes in the steps S801 to S808) performed with the image pickup apparatus 100 will be described with reference to a timing chart. FIG. 9A is a timing chart showing the display control process performed with the image pickup apparatus 100, and shows temporal changes of the detection value S, EVF drive voltage, an EVF display state, monitor drive voltage, and a monitor display state. FIG. 9B is a view schematically showing a relation among the distance between the user 58 and the rear side of the image pickup apparatus 100, the first threshold TH1, the second threshold TH12, and the third threshold TH13. FIG. 9B shows that the detection value S becomes equal to the first threshold TH11 when the distance between the user 58 and the image pickup apparatus 100 is L11, becomes equal to the second threshold TH12 when the distance between the user 58 and the image pickup apparatus 100 is L12, and becomes equal to the third threshold TH13 when the distance between the user 58 and the image pickup apparatus 100 is L13.

Before a timing T11, the user 58 is at a position of which distance from the rear face of the image pickup apparatus 100 is longer than the distance L13. That is, it is determined that the user 58 uses the monitor 6 without using the finder 40 of the image pickup apparatus 100. Accordingly, since the detection value S is smaller than the third threshold TH13, the monitor 6 is in the monitor display mode and the EVF 151 is in the EVF's first power saving mode. Thus, the power consumption concerning the image display on the EVF 151 is reduced as much as possible by setting the EVF 151 to the EVF's first power saving mode.

When the user 58 reaches a position where the distance from the rear face of the image pickup apparatus 100 becomes L13 at the timing T11, the detection value S becomes equal to or larger than the third threshold TH13. Although it is determined that the user 58 is using the monitor 6 because the user 58 is at the position more distant than the position where the distance from the image pickup apparatus 100 is L12 at this time, there is a high possibility of using the finder 40 after that. Accordingly, the image pickup apparatus 100 changes the EVF's first power saving mode to the EVF's second power saving mode while keeping the monitor display mode. This enables to display an image on the EVF 151 immediately when the user 58 further approaches the image pickup apparatus 100.

When the user 58 reaches a position where the distance from the rear face of the image pickup apparatus 100 becomes L12 at a timing T12, the detection value S becomes equal to or larger than the second threshold TH12. Since it is determined that the user 58 uses the finder 40 at this time, the image pickup apparatus 100 changes the monitor display mode to the monitor's second power saving mode and changes the EVF's second power saving mode to the EVF display mode. This reduces the power consumption concerning the image display on the monitor 6.

When the user 58 reaches a position where the distance from the rear face of the image pickup apparatus 100 becomes L11 at a timing T13, the detection value S becomes equal to or larger than the first threshold TH11. At this time, it is determined that an eye of the user 58 approaches the finder 40 and looks in the EVF 151. Accordingly, the image pickup apparatus 100 changes the monitor's second power saving mode to the monitor's first power saving mode while keeping the EVF display mode. Since the EVF 151 is already in the EVF display mode when the eye of the user 58 approaches the finder 40, the user 58 is able to look at an image displayed on the EVF 151 without waiting to display an image on the EVF 151. On the other hand, the power consumption concerning the image display on the monitor 6 is reduced as much as possible.

When the user 58 goes away from the image pickup apparatus 100 (i.e., when the state where the user looks at the image on the EVF 151 is shifted to the state where the user looks at the image on the monitor 6), an operation control contrary to the case where the user 58 approaches the image pickup apparatus 100 can be performed. However, the operation control is not restricted to this. Thresholds used in the case where the user 58 goes away from the image pickup apparatus 100 may be different from thresholds used in the case where the user 58 approaches the image pickup apparatus 100. FIG. 9A shows the example in which a fourth threshold TH14, a fifth threshold TH15, and a sixth threshold TH16 are used when the user 58 goes away from the image pickup apparatus 100.

When the user 58 goes away from the image pickup apparatus 100 and the user 58 moves to a position where a distance from the image pickup apparatus 100 is longer than the distance L11 by a predetermined distance $\Delta L11$ at a timing T4, the detection value S becomes smaller than the fourth threshold TH14. It should be noted that a relationship of $L11+\Delta L1 < L12$ holds, and the fourth threshold TH14 is smaller than the first threshold TH11 and is larger than the second threshold TH12. When the detection value S becomes smaller than the fourth threshold TH14, the image pickup apparatus 100 changes the monitor's first power saving mode to the monitor's second power saving mode while keeping the EVF display mode. Thus, since the threshold used when the user 58 approaches the image pickup apparatus 100 is different from the threshold used when the user 58 goes away from the display apparatus 1 (there is hysteresis), frequent switching of the operation mode of the image pickup apparatus 100 is prevented when the user 58 exists near a position corresponding to a threshold.

When the user 58 further goes away from the image pickup apparatus 100 and the user 58 moves to a position where a distance from the image pickup apparatus 100 is longer than the distance L12 by a predetermined distance $\Delta L12$ at a timing T15, the detection value S becomes smaller than the fifth threshold TH15. It should be noted that a relationship of $L12+\Delta L12<L13$ holds, and the fifth threshold TH15 is smaller than the second threshold TH12 and is larger than the third threshold TH13. Thus, when the detection value S becomes smaller than the fifth threshold TH15, the image pickup apparatus 100 changes the monitor's second power saving mode to the monitor display mode and changes the EVF display mode to the EVF's second power saving mode.

When the user 58 further goes away from the image pickup apparatus 100 and the user 58 moves to a position where a distance from the image pickup apparatus 100 is longer than the distance L13 by a predetermined distance ΔL13 at a timing T16, the detection value S becomes smaller than the sixth threshold TH16. The sixth threshold TH16 is smaller than the third threshold TH13. When the detection value S becomes smaller than the sixth threshold TH16, the image pickup apparatus 100 changes the EVF's second power saving mode to the EVF's first power saving mode while keeping the monitor display mode.

As described above, since the image pickup apparatus 100 in the second embodiment displays an image on only one of the monitor 6 and the EVF 151 according to the using condition by the user 58, the suitable image information is supplied to the user 58 while reducing the power consumption efficiently. Particularly, since an image is already displayed on the EVF 151 when the eye of the user 58 actually approaches the finder of the image pickup apparatus 100, a time lag from the eye's approach to the image display, which occurs in a conventional apparatus, does not occur, which improves operability for the user 58.

Although the monitor 6 and the EVF 151 employ the liquid crystal type or the organic EL type, another type may be employed in the second embodiment, they may employ other display types. Moreover, although the case where the user 58 approaches or goes away from the display apparatus was described in the above description, the present invention is able to apply to a case where the distance between the display apparatus and the user 58 varies relatively. Although the above-mentioned embodiments measure the relative distance by projecting and receiving the infrared light, the measurement method is not restricted to the infrared light method. For example, a capacitive sensing method, a taken-image analysis method, etc. may be used.

Furthermore, although the electric power supply to the display apparatus 1 is stopped in the first power saving mode and the drive voltage for the display apparatus 1 is generated but the monitor 6 is not lighted in the second power saving mode in the first embodiment, the control method is not restricted as long as the first power saving mode is lower than the second power saving mode in the power consumption. Moreover, the control method is not restricted as long as the second power saving mode is smaller than the display mode in the power consumption and the shifting time from the second power saving mode to the display mode is shorter than the shifting time from the first power saving mode to the display mode.

For example, although the monitor 6 does not display an image in the second power saving mode in the first embodiment, an image may be displayed on the monitor 6 even in the second power saving mode as long as the power consumption in the second power saving mode is smaller than the power consumption in the display mode. For example, an image may be displayed in the second power saving mode with lower intensity than that in the display mode. At this time, it is preferable to correct a gradation characteristic so that a bright part in a displayed image is brightly displayed by a gamma correction (the tone of the bright part is increased). Moreover, when a display panel of a display apparatus has white display pixels in addition to the pixels of RGB, the contribution to the display luminance of the white pixels may be relatively increased.

Although the image pickup apparatus 100 shifts to the EVF's second power saving mode from the EVF's first power saving mode in the step S806 in the second embodiment, it may directly shift to the EVF display mode when the user 58 approaches the image pickup apparatus 100. In this case, although the power consumption increases, the shifting time to the EVF display mode is shorter than the case of shifting via the EVF's second power saving mode. Moreover, although the image pickup apparatus 100 shifts to the monitor's second power saving mode from the monitor display mode in the step S807, it may directly shift to the monitor display mode when the user 58 goes away from the image pickup apparatus 100. In this case, although the power consumption increases, the shifting time to the monitor display mode is shorter than the case of shifting via the monitor's second power saving mode.

Although the above-mentioned embodiments describe the display apparatus 1, which is connected to the external apparatus, and the image pickup apparatus 100, the present invention is not limited to these. The present invention is able to apply to an electronic apparatus with a display apparatus regardless of a type (fixed or portable).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-001559, filed Jan. 7, 2015, which is hereby incorporated by reference herein in its entirety.

What is claimed is:
1. An electronic apparatus comprising:
a display unit;
a detection unit configured to detect a distance between said display unit and an object; and a control unit configured to change an operation mode of said display unit according to the distance between said display unit and the object detected by said detection unit, wherein the operation mode includes at least a display mode in which said display unit displays an image, and first and second power saving modes in which power consumption is smaller than power consumption in the display mode, wherein the power consumption in the second power saving mode is larger than the power consumption in the first power saving mode, and shifting time to the display mode from the second power saving mode is shorter than shifting time to the display mode from the first power saving mode, and wherein said control unit sets said display unit to the display mode when the object is at a position of which distance from said display unit is shorter than a predetermined first distance, sets said display unit to the second power saving mode when the object is at a position of which distance from said display unit is longer than the first distance and is shorter than a predetermined second distance, and sets said display unit to the first power saving mode when the object is at a position of which distance from said display unit is longer than the second distance.

2. The electronic apparatus according to claim 1, further comprising,
a generation unit configured to generate drive voltage for said display unit, and
a driving unit configured to drive said display unit,
wherein said generation unit does not generate the drive voltage and said drive unit does not drive said display unit in the first power saving mode, and
wherein said generation unit generates the drive voltage and supplies the generated drive voltage to said display unit and said drive unit does not drive said display unit in the second power saving mode.

3. The electronic apparatus according to claim 1, further comprising a light control unit configured to control luminance of said display unit,
wherein said control unit does not allow said display unit to display in the first power saving mode, and wherein said control unit allows said display unit to display and said light control unit controls the luminance of said display unit so as to be lower than the luminance in the display mode, in the second power saving mode.

4. The electronic apparatus according to claim 1, further comprising a correction unit configured to correct a gradation characteristic of an image displayed on said display unit,
wherein said control unit does not allow said display unit to display in the first power saving mode, and wherein said control unit allows said display unit to display and said correction unit corrects the gradation characteristic of the displayed image so that a tone of a bright part is relatively increased in the second power saving mode as compared with a gradation characteristic in the display mode.

5. The electronic apparatus according to claim 1, wherein said display unit has red display pixels, green display pixels, blue display pixels, and white display pixels,
wherein said control unit does not allow said display unit to display in the first power saving mode, and wherein said control unit allows said display unit to display and increases contribution to display luminance of the white display pixels in the second power saving mode so as to be higher than the contribution in the display mode.

6. The electronic apparatus according to claim 1, further comprising an operation detecting unit configured to detect a touch operation to said display unit,
wherein said control unit validates a detecting function for the touch operation of said operation detecting unit when said display unit is in a displaying state, and invalidates the detecting function when said display unit is in a non-displaying state.

7. The electronic apparatus according to claim 1, further comprising a setting unit configured to set up a first threshold corresponding to the first distance and a second threshold corresponding to the second distance,
wherein said control unit changes the operation mode of said display unit among the display mode, the first power saving mode, and the second power saving mode by determining the distance from said display unit to the object while comparing the detection value from said detection unit with the first threshold and the second threshold.

8. The electronic apparatus according to claim 1, wherein the first distance in a case where the object relatively goes away from said display unit is extended as compared with a case where the object relatively approaches said display unit.

9. The electronic apparatus according to claim 1, wherein the second distance in a case where the object relatively goes away from said display unit is extended as compared with a case where the object relatively approaches said display unit.

10. The electronic apparatus according to claim 1, further comprising,
a generation unit configured to generate drive voltage for said second display unit, and
a driving unit configured to drive said second display unit,
wherein said generation unit does not generate the drive voltage and said drive unit does not drive said second display unit in the first power saving mode, and
wherein said generation unit generates the drive voltage and supplies the generated drive voltage to said second display unit and said drive unit does not drive said second display unit in the second power saving mode.

11. The electronic apparatus according to claim 1, further comprising a setting unit configured to set up a first threshold corresponding to the first distance, a second threshold corresponding to the second distance, and a third threshold corresponding to the third distance,
wherein said control unit changes each of the operation modes of said first display unit and said second display unit among the display mode, the first power saving mode, and the second power saving mode by determining the distance from said first display unit to the object while comparing the detection value from said detection unit with the first threshold, the second threshold, and the third threshold.

12. The electronic apparatus according to claim 1, further comprising a generation unit configured to generate drive voltage for said display unit,
wherein said generation unit does not generate the drive voltage in the first power saving mode, and wherein said generation unit generates the drive voltage, and does not supply the generated drive voltage to said display unit in the second power saving mode.

13. The electronic apparatus according to claim 12, wherein said display unit comprises a liquid crystal display panel and an illuminating device, and wherein said generation unit generates the drive voltage for at least one of the liquid crystal display panel and the illuminating device.

14. An electronic apparatus comprising:
a first display unit;
a second display unit;
a detection unit configured to detect a distance between said first display unit and an object; and
a control unit configured to change operation modes of said first display unit and said second display unit according to the distance between said first display unit and the object detected by said detection unit,
wherein each of the operation modes for said first display unit and said second display unit include at least a display mode for displaying, and first and second power saving modes in which power consumption is smaller than power consumption in the display mode,
wherein the power consumption in the second power saving mode is larger than the power consumption in the first power saving mode, and shifting time to the display mode from the second power saving mode is shorter than shifting time to the display mode from the first power saving mode,
wherein said control unit sets said first display unit to the display mode and sets said second display unit to the first power saving mode when the object is at a position of which distance from said first display unit is shorter than a predetermined first distance, sets said first display unit to the display mode and sets said second display unit to the second power saving mode when the object is at a position of which distance from said first display unit is longer than the first distance and is shorter than a predetermined second distance,
sets said first display unit to the second power saving mode and sets said second display unit to the display mode when the object is at a position of which distance from said first display unit is longer than the second distance and is shorter than a predetermined third distance, and
sets said first display unit to the first power saving mode and sets said second display unit to the display mode when the object is at a position of which distance from said first display unit is longer than the third distance.

15. The electronic apparatus according to claim 14, further comprising an operation detecting unit configured to detect a touch operation to said second display unit,
wherein said control unit validates a detecting function for the touch operation of said operation detecting unit when said second display unit is in a displaying state, and invalidates the detecting function when said second display unit is in a non-displaying state.

16. The electronic apparatus according to claim 14, wherein the first distance in a case where the object relatively goes away from said first display unit is extended as compared with a case where the object relatively approaches said first display unit.

17. The electronic apparatus according to claim 14, wherein the second distance in a case where the object relatively goes away from said first display unit is extended as compared with a case where the object relatively approaches said first display unit.

18. The electronic apparatus according to claim 14, wherein the third distance in a case where the object relatively goes away from said first display unit is extended as compared with a case where the object relatively approaches said first display unit.

19. The electronic apparatus according to claim 14, wherein the electronic apparatus is an image pickup apparatus, said first display unit is an electronic view finder, and said second display unit is a monitor provided on a rear face of a body of the image pickup apparatus.

20. The electronic apparatus according to claim 19, further comprising a light control unit configured to control luminance of said second display unit,
wherein said control unit does not allow said second display unit to display when said second display unit is in the first power saving mode, and
wherein said control unit allows said second display unit to display and said light control unit controls the luminance of said second display unit so as to be lower than the luminance in the display mode when said second display unit is in the second power saving mode.

21. The electronic apparatus according to claim 19, further comprising a correction unit configured to correct a gradation characteristic of an image displayed on said second display unit,
wherein said control unit does not allow said second display unit to display when said second display unit is in the first power saving mode, and
wherein said control unit allows said second display unit to display and said correction unit corrects the gradation characteristic of the displayed image so that a tone of a bright part is relatively increased when said second display unit is in the second power saving mode as compared with a gradation characteristic when said second display unit is in the display mode.

22. The electronic apparatus according to claim 19, wherein said second display unit has red display pixels, green display pixels, blue display pixels, and white display pixels,
wherein said control unit does not allow said second display unit to display when said second display unit is in the first power saving mode, and wherein said control unit allows said second display unit to display and increases contribution to display luminance of the white pixels when said second display unit is in the second power saving mode so as to be higher than the contribution when said second display unit is in the display mode.

23. The electronic apparatus according to claim 19, further comprising a generation unit configured to generate drive voltage for said second display unit,
wherein said generation unit does not generate the drive voltage when said second display unit is in the first power saving mode, and
wherein said generation unit generates the drive voltage, and does not supply the generated drive voltage to said second display unit when said second display unit is in the second power saving mode.

24. The electronic apparatus according to claim 23, wherein said second display unit comprises a liquid crystal display panel and an illuminating device, and
wherein said generation unit generates the drive voltage for at least one of the liquid crystal display panel and the illuminating device.

25. A display control method for an electronic apparatus with a display unit, the display control method comprising:
a setting step of setting up a first distance and a second distance that is longer than the first distance about a distance from the display unit to an object;
a detection step of detecting a distance between the display unit and the object; and a control step of changing an operation mode of the display unit based on a distance between the display unit and the object detected in said detection step among a display mode in which an image is displayed, a first power saving mode that is smaller than the display mode in power consumption, and a second power saving mode that is smaller than the display mode and larger than the first power saving mode in the power consumption, and shifting time to the display mode from the second power saving mode being shorter than shifting time to the display mode from the first power saving mode, wherein the display unit is set to the display mode when the object is at a position of which distance from the display unit is shorter than a predetermined first distance, is set to the second power saving mode when the object is at a position of which distance from the display unit is longer than the first distance and is shorter than a predetermined second distance, and is set to the first power saving mode when the object is at a position of which distance from the display unit is longer than the second distance in said control step.

26. A display control method for an electronic apparatus with a first display unit and a second display unit, the display control method comprising:

a setting step of setting up a first distance, a second distance that is longer than the first distance, and a third distance that is longer than the second distance about a distance from the first display unit to an object;

a detection step of detecting a distance between the first display unit and the object; and a control step of changing each of operation modes of the first display unit and the second display unit based on a distance between the first display unit and the object detected in said detection step among a display mode in which an image is displayed, a first power saving mode that is smaller than the display mode in power consumption, and a second power saving mode that is smaller than the display mode and larger than the first power saving mode in the power consumption, and shifting time to the display mode from the second power saving mode being shorter than shifting time to the display mode from the first power saving mode, wherein the first display unit is set to the display mode and the second display unit is set to the first power saving mode when the object is at a position of which distance from the first display unit is shorter than the first distance, the first display unit is set to the display mode and the second display unit is set to the second power saving mode when the object is at a position of which distance from the first display unit is longer than the first distance and is shorter than the second distance, the first display unit is set to the second power saving mode and the second display unit is set to the display mode when the object is at a position of which distance from the first display unit is longer than the second distance and is shorter than the third distance, and the first display unit is set to the first power saving mode and the second display unit is set to the display mode when the object is at a position of which distance from the first display unit is longer than the third distance in said control step.

\* \* \* \* \*